US006816108B2

United States Patent
Steinlechner et al.

(10) Patent No.: US 6,816,108 B2
(45) Date of Patent: Nov. 9, 2004

(54) METHOD FOR DETERMINING A ROTATIONAL ANGLE OR A DISTANCE BY EVALUATING PHASE MEASURED VALUES

(75) Inventors: Siegbert Steinlechner, Leonberg (DE); Axel Wenzler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,098

(22) PCT Filed: Aug. 31, 2001

(86) PCT No.: PCT/DE01/03291

§ 371 (c)(1),
(2), (4) Date: Jun. 26, 2003

(87) PCT Pub. No.: WO02/18971

PCT Pub. Date: Mar. 7, 2002

(65) Prior Publication Data

US 2004/0080451 A1 Apr. 29, 2004

(30) Foreign Application Priority Data

Aug. 31, 2000 (DE) .......................... 100 42 660

(51) Int. Cl.[7] .............................................. G01S 13/36
(52) U.S. Cl. ........................ 342/118; 346/127; 346/135
(58) Field of Search .......................... 342/28, 109, 115, 342/118, 124, 127, 135; 356/5.1; 33/1 PT

(56) References Cited

U.S. PATENT DOCUMENTS 5,198,822 A * 3/1993 Brown ...................... 342/424
5,237,333 A * 8/1993 Guard ....................... 342/424
6,489,917 B2 * 12/2002 Geisheimer et al. ........ 342/127
6,665,335 B1 * 12/2003 Rajagopal et al. .......... 375/224
2002/0097180 A1 * 7/2002 Geisheimer et al. ........ 342/127
2004/0007663 A1 * 1/2004 Steinlechner et al. .. 250/231.16
2004/0010928 A1 * 1/2004 Steinlechner et al. ....... 33/1 PT
2004/0080451 A1 * 4/2004 Steinlechner et al. ....... 342/127

FOREIGN PATENT DOCUMENTS

DE      195 06 938 A1    8/1996
EP       0 693 693 A     1/1996

OTHER PUBLICATIONS

"Block–coded PSK modulation using two–level group codes over dihedral groups", Bali, J.;Rajan, B.S.;Information Theory, IEEE Transactions on, vol.: 44, Issue: 4, Jul. 1998 Ps: 1620–1631.*

* cited by examiner

*Primary Examiner*—John B. Sotomayor
(74) *Attorney, Agent, or Firm*—Michael J. Striker

(57) ABSTRACT

The invention proposes a method for determining a rotation angle or distance by evaluating a multitude of phase measurement values. By means of a linear transformation A, the phase values measured in an N-dimensional space are projected into N-1 new signals $S_i$. These signals $S_i$ are transformed by a quantizing device into corresponding integer values $W_i$ and converted into N real values $Z_i$ by means of a linear projection C. These values have weighted phase measurement values $\alpha_i$ added to them in modulo $2\pi$ fashion, which yields N estimates for the angle $\phi$ to be measured. The N estimates are corrected if needed at their skip points and are added up in a weighted fashion, taking into account their phase angle.

2 Claims, 5 Drawing Sheets

MEASUREMENTS POINTS IN THE T PLANE

METHOD FOR DETERMINING A ROTATIONAL ANGLE OR A DISTANCE BY EVALUATING PHASE MEASURED VALUES

PRIOR ART

Some technical measuring tasks yield several phase measurement values; the quantity to be measured, e.g. an angle or a distance to a target, must be determined from among these phase measurement values.
Examples of this include:

Distance measurement with RADAR or with modulated laser light. N measurements are carried out with different frequencies $f_1 \ldots f_N$. At the reception point, the signals reflected by the target at a distance of x have the following phase shifts (c=the speed of light):

$$\alpha_i = \frac{2 \cdot \pi \cdot f_i \cdot 2 \cdot x}{c}$$

The phase shifts are thus proportional to the quantity to be measured and to the frequency used. However, the actual measurement values of the phases always lie in the range from 0 to $2\pi$, i.e. they are always determined only up to integral multiples of $2\pi$.

Optical angle transmitter: scanning of N optical ruled gratings. N traces are placed on a disk or a cylinder with optical ruled gratings. In one rotation, there are therefore $n_i$ periods or marks. If the phase positions of the traces are measured with the aid of optoelectronic detectors in relation to a fixed measurement window, then this yields the phase positions:

$$\alpha = n_i \cdot \phi$$

The phases are thus proportional to the torsion angle $\phi$ and the periodicities $n_i$. Here, too, the actual measurement values always lie in the range from 0 to $2\pi$.

The following methods are known for evaluating these signals, i.e. for determining x and $\phi$:

Classic Vernier Method:

The difference between 2 measurement angles is calculated; if it is less than 0, then $2\pi$ is added. This method has serious limitations: measurement errors in the angles have a significant impact on the end result; in addition, the method only works if the two periodicities being considered differ by precisely 1.

Modified Vernier Method (See DE P 19506938):

From 2 measurement angles, the value of the quantity to be measured is determined through weighted addition and the further addition of an angular range-dependent constant. The advantage therein is that measurement errors in the angles are reduced by a factor of <1.

Cascaded, Modified Vernier Method:

The modified vernier method is used multiply for a number of traces in a hierarchical arrangement.

OBJECT OF THE INVENTION

The object of the invention is to obtain an optimal, unambiguous phase measurement value from N multivalued, distorted phase signals $\alpha_i$, wherein the disadvantages of the known methods are circumvented.

Possible uses include tasks in which a high-precision, robust measurement value must be determined from among a number of phase signals, e.g.:

multi-frequency distance measurement
angle measurement
combined angle- and torque measurement using RADAR, laser, optical, magnetic, or other sensor principles.

ADVANTAGES OF THE INVENTION

The invention permits direct, optimal, non-hierarchical evaluation of N phase signals.

In contrast with the known methods, virtually any periodicity $n_i$ can be used. Measurement errors in the individual phase signals are clearly reduced. The inclusion of a number of phase traces can achieve a distinctly increased tolerance with regard to measurement errors.

In particular, the invention is suited to optimally evaluating the signals of an optical TAS (torque angle sensor).

DETAILED DESCRIPTION

FIG. 7 shows a block circuit diagram and FIG. 8 shows a detail of the invention.

A sensor (FIG. 7, e.g. an optical angle sensor with N traces) supplies the N measured angle values $\alpha_i$, i=1 ... N. When the sensor sweeps for one rotation ($2\pi$) over mechanical torsion angles to be determined, then the phase angles $\alpha_i$ sweep $n_i \ldots n_N$ times over the measuring region $2\pi$. The values $n_1 \ldots n_N$ are the periodicities of the individual traces.

The angle values, which are usually in digital form, first undergo a simple linear transformation A. This turns the N angle values into N–1 new signals $S_i$ so that ideal angle values are mapped in an integral (N–1)-dimensional grid. For example, the transformation can be executed as follows:

$$S_i = \frac{\alpha_{i+1} \cdot n_i - \alpha_i \cdot n_{i+1}}{2 \cdot \pi \cdot ggT(n_i, n_{i+1})}$$

Where ggT is the greatest common devisor of the numbers involved.

If there are measurement errors in the angle values, then this causes the signals $S_i$ to lie not exactly on the integral grid, but only in the vicinity of it. With the aid of a quantizing device, the signals $S_i$ are projected onto the integer values $W_i$, which lie on above-mentioned grid, and thus the effects of the measurement errors are eliminated.

Then the (N–1) values $W_i$ undergo a simple linear projection C, which yields N real values $Z_i$. These values $Z_i$ are proportional to the number of periods of the corresponding angle value $\alpha_i$ that have been passed through.

These values $Z_i$ have the weighted angle values as added to them. This addition is executed in modulo $2\pi$ fashion. The weighting factors and the above-mentioned linear projection C are selected so that after the addition, N estimates are obtained for the angle $\phi$ to be measured.

Then these estimates are added up in a weighted fashion. In some instances, a correction must be made here, since angle values in the vicinity of 0 and in the vicinity of $2\pi$ must be considered to be neighboring.

Example: 2 values of $0.01\pi$ and $1.97\pi$ must each be added to weights of 0.5.

$$(0.01\pi + 2\pi)/2 + 1.977\pi = 1.99\pi$$

This means that $2\pi$ is added to one value in order bring it into the vicinity of the other.

Finally, this yields the optimal measurement value $\phi_{meas}$.

FIG. 8 shows the block circuit diagram of the above-mentioned quantizing device.

As mentioned above, the signals $S_i$ lie in the vicinity of an integral grid. Frequently, depending on the periodicities and transformations, however, only very particular positions of the integral grid are occupied. A direct rounding of the values $S_i$ would frequently lead to incorrect results since the rounding also yields grid points that are not permitted. For this reason, the values $S_i$ are converted by means of a simple transformation B into the values $T_i$, wherein the values $T_i$ also lie in the vicinity of integral grid points, but with the difference that all integral grid positions are permitted.

A rounding of the values $T_i$ converts them into the N−1 integer values $U_i$, which describe the association of a measurement point to a grid point.

However, the respective rounding of $T_i$ can also result in a value $U_i$, that is too high by 1 or too low by 1. Therefore, first the difference $T_i - U_i$ (i=1 ... N−1) is calculated, which describes the distance of the measurement point to the rounded grid point in the direction i. In a region correction device, these distances are compared to predetermined limits and a determination is made as to whether the measurement value needs to be associated with a neighboring point of the grid. This yields N−1 correction values, which can assume the values −1, 0, or 1. These correction values are added to the $U_i$ and yield the corrected values $V_i$.

By means of simple transformation $B^{-1}$, the corrected values are then transformed back to the original grid, in which the values $S_i$ lie in the ideal case. $B^{-1}$ is the exact opposite of the transformation B.

Example for N=3 Traces

The periodicities are $n_1=5$, $n_2=4$, $n_3=3$. At the top, FIG. 1 shows the course of the mechanical angle $\phi$ to be determined, and below this, shows the three phase measurement values $\alpha_i$ (encumbered with measurement errors of ±20°).

The transformation A reads as follows in matrix notation:

$$A = \frac{1}{2 \cdot \pi} \cdot \begin{bmatrix} 4 & -5 & 0 \\ 0 & 3 & -4 \end{bmatrix}$$

$$\begin{bmatrix} S_1 \\ S_2 \end{bmatrix} = A \cdot \begin{bmatrix} \alpha_1 \\ \alpha_2 \\ \alpha_3 \end{bmatrix}$$

$$B = \frac{1}{4} \cdot \begin{bmatrix} 2 & 2 \\ 1 & -1 \end{bmatrix}$$

$$\begin{bmatrix} T_1 \\ T_2 \end{bmatrix} = B \cdot \begin{bmatrix} S_1 \\ S_2 \end{bmatrix}$$

Figure 1:
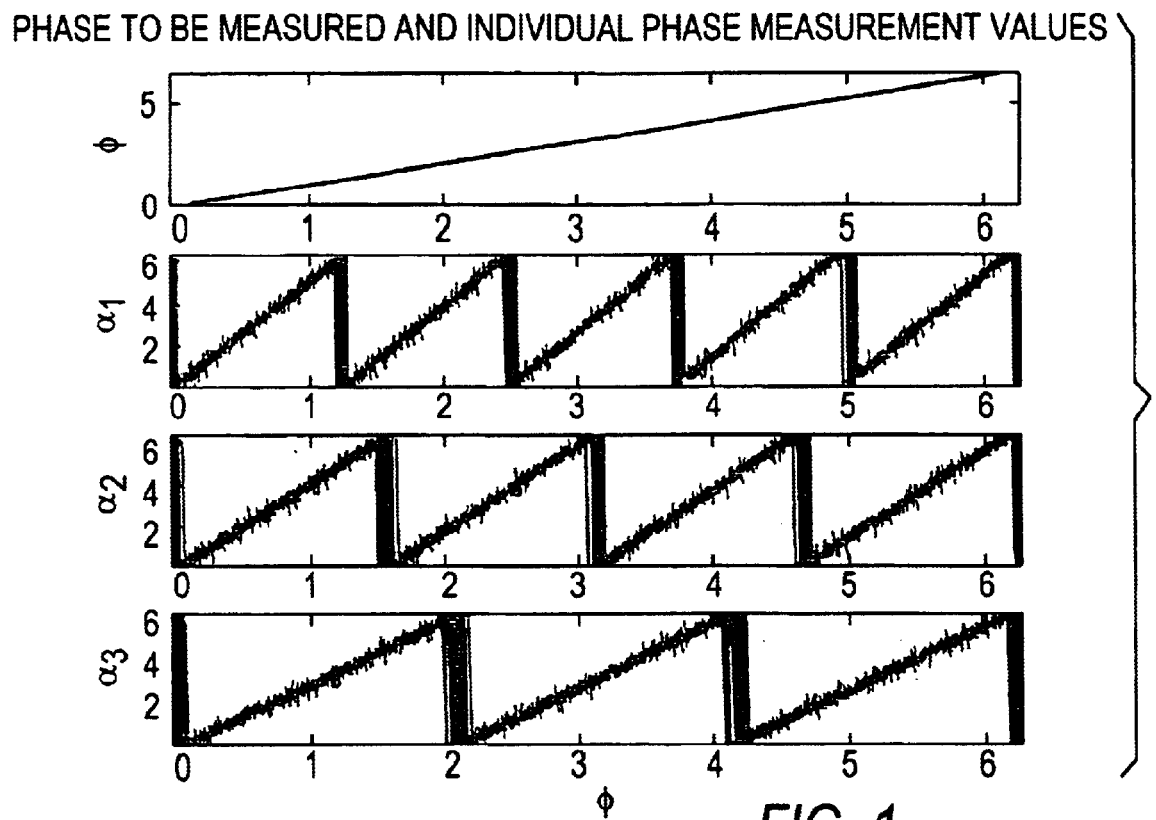
Figure 2:
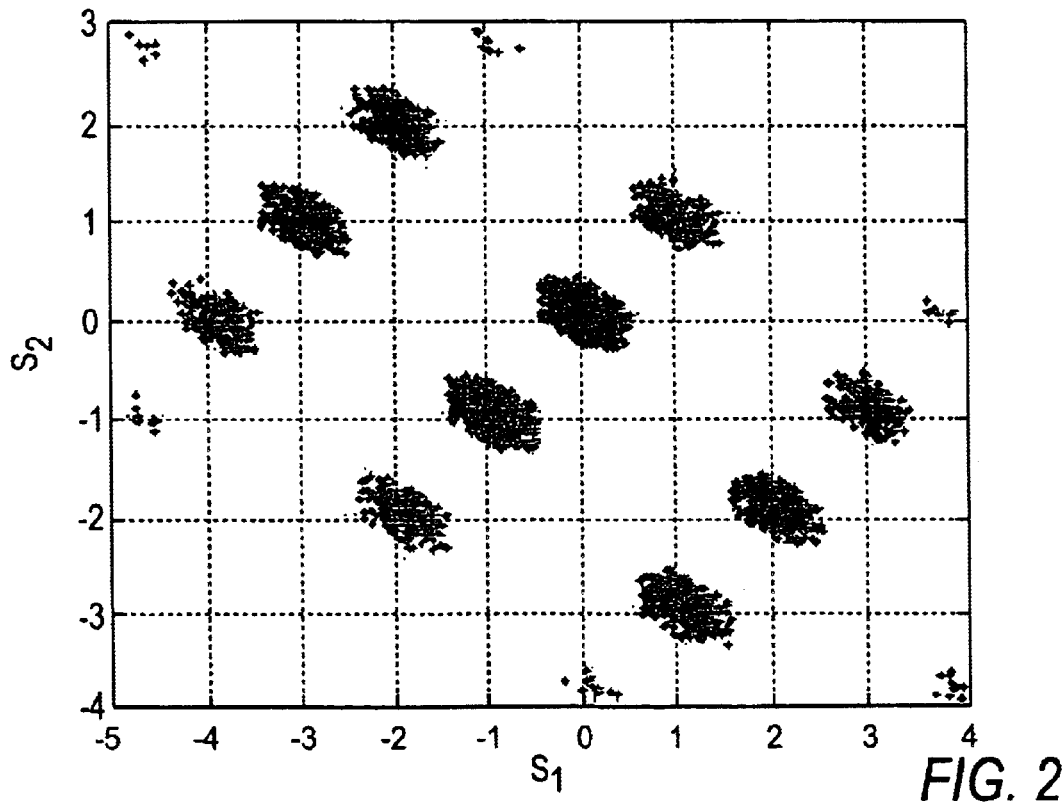
FIG. 2 shows the points S after the transformation.
Figure 3:
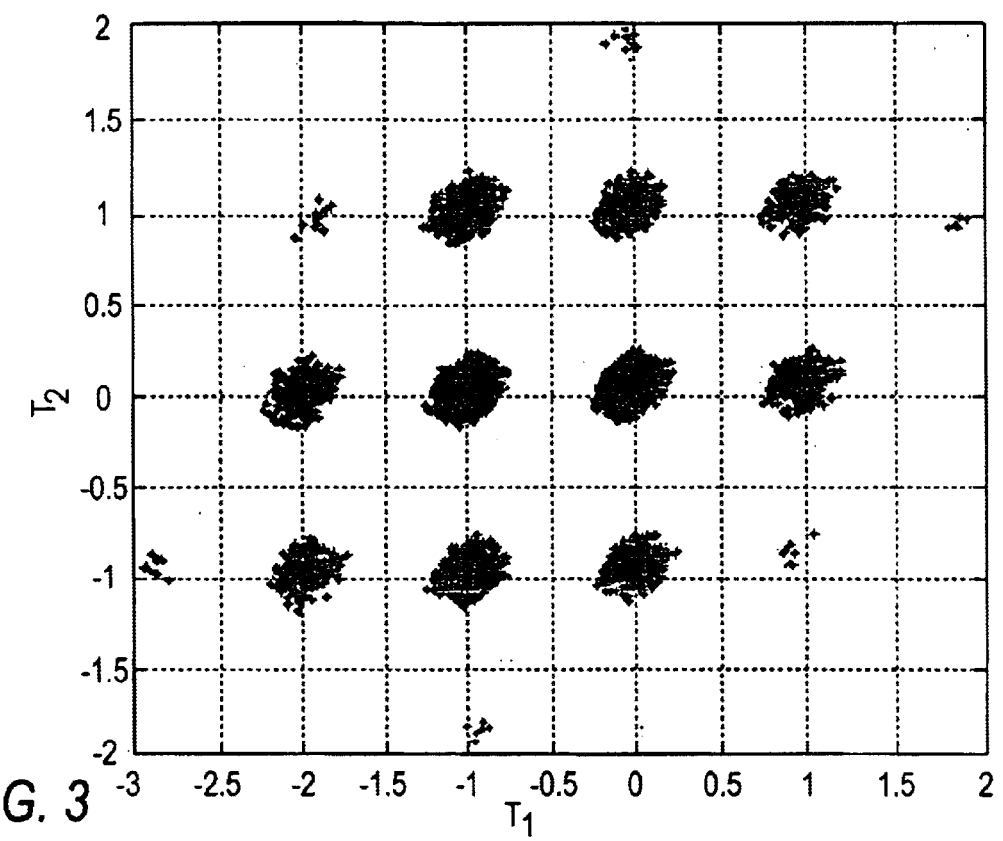
FIG. 3 shows the measurement points mapped in the T plane. The necessary transformation B reads as follows in matrix notation.
Figure 4:
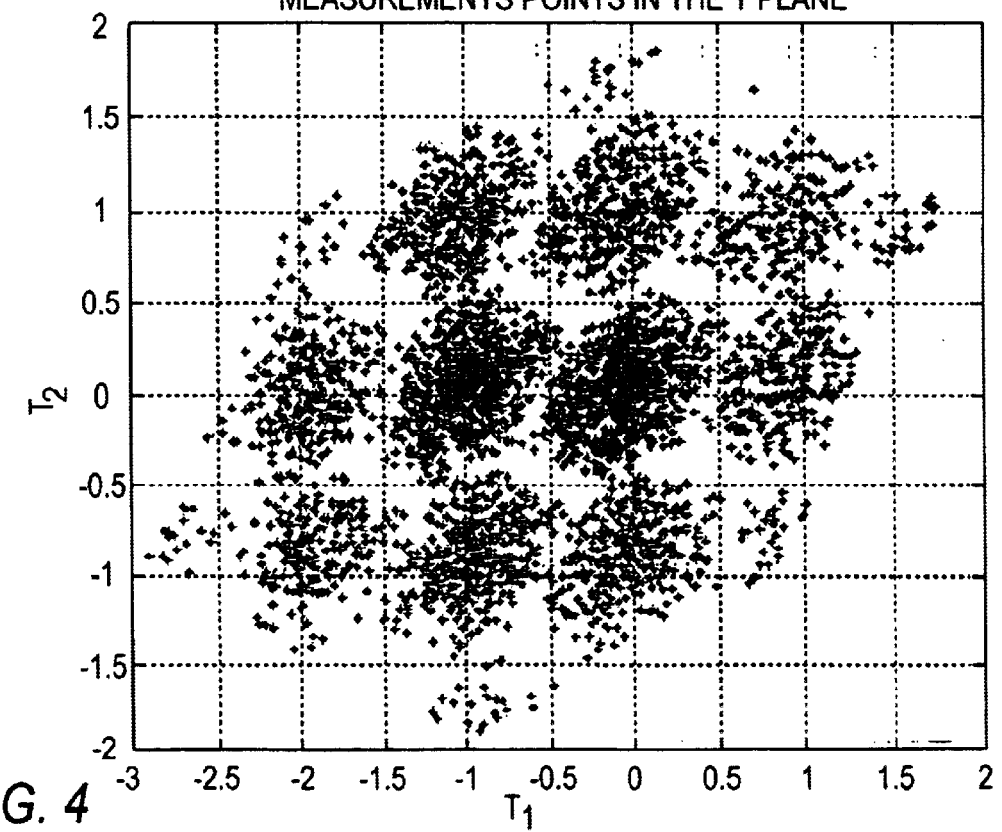

For purposes of explaining the necessary region correction, FIG. 4 depicts the T plane when there are higher measurement errors of ±45°, ±60°, and ±45°.

Figure 5:
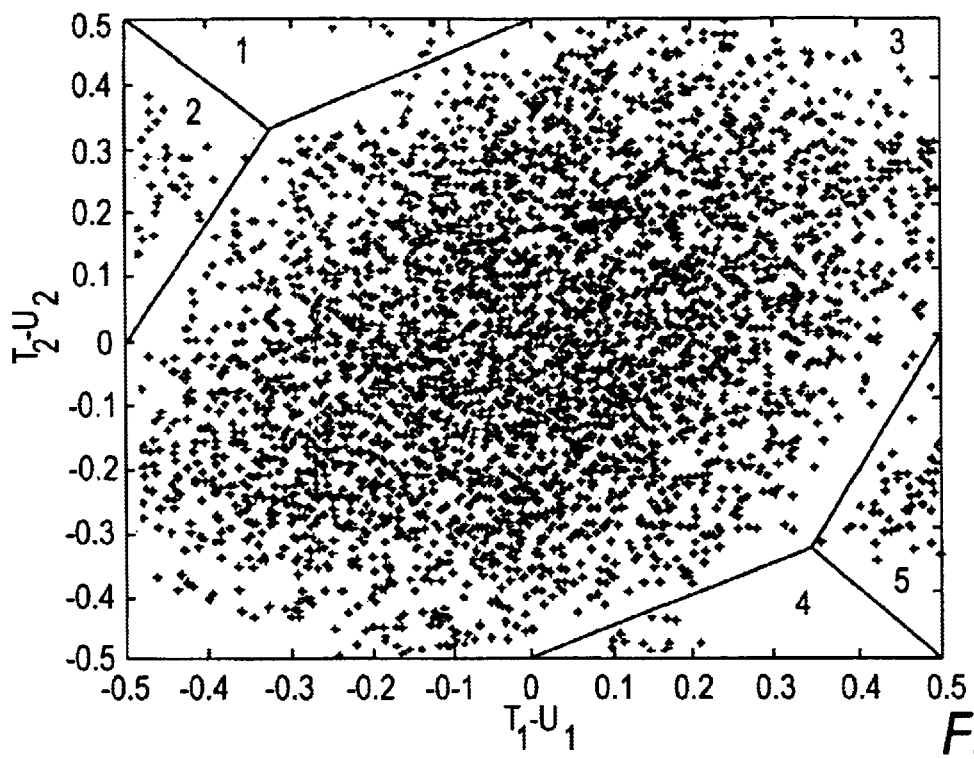

In some cases, the contour causes the subsequent rounding to integer values to result in an incorrect association. FIG. 5 shows the (T-U) plane divided into zones. In the middle zone (3), the rounding has been successful, in the zones 1, 2, 4, & 5, corrections are necessary, which are calculated by the region correction device and are then added to the U values:

| Zone | Action | |
|------|--------|---|
| 1 | $V_1 = U_1$ | $V_2 = U_2 + 1$ |
| 2 | $V_1 = U_1 - 1$ | $V_2 = U_2$ |
| 3 | $V_1 = U_1$ | $V_2 = U_2$ |
| 4 | $V_1 = U_1$ | $V_2 = U_2 - 1$ |
| 5 | $V_1 = U_1 + 1$ | $V_2 = U_2$ |

The zones are selected to be dependent on the periodicities so that up to a maximal permissible measurement error of the phase values, no grid skips occur.

The subsequent transformation $B^{-1}$ has the form:

$$B^{-1} = \begin{bmatrix} 1 & 2 \\ 1 & -2 \end{bmatrix}$$

$$\begin{bmatrix} W_1 \\ W_2 \end{bmatrix} = B^{-1} \cdot \begin{bmatrix} V_1 \\ V_2 \end{bmatrix}$$

The linear projection C has the form:

$$C = 2 \cdot \pi \cdot \begin{bmatrix} \frac{1}{5} & 0 \\ \frac{1}{4} & 0 \\ 0 & \frac{1}{3} \end{bmatrix}$$

$$\begin{bmatrix} Z_1 \\ Z_2 \\ Z_3 \end{bmatrix} = C \cdot \begin{bmatrix} W_1 \\ W_2 \end{bmatrix}$$

After the measurement values as are weighted, they are added to the values $Z_i$. This addition is executed in modulo $2\pi$ fashion. This yields N estimates for the angle $\phi$. The weights for the angle values $\alpha_1$, $\alpha_2$, $\alpha_3$ in this case are ⅕, ¼, and ⅓.

Figure 6:
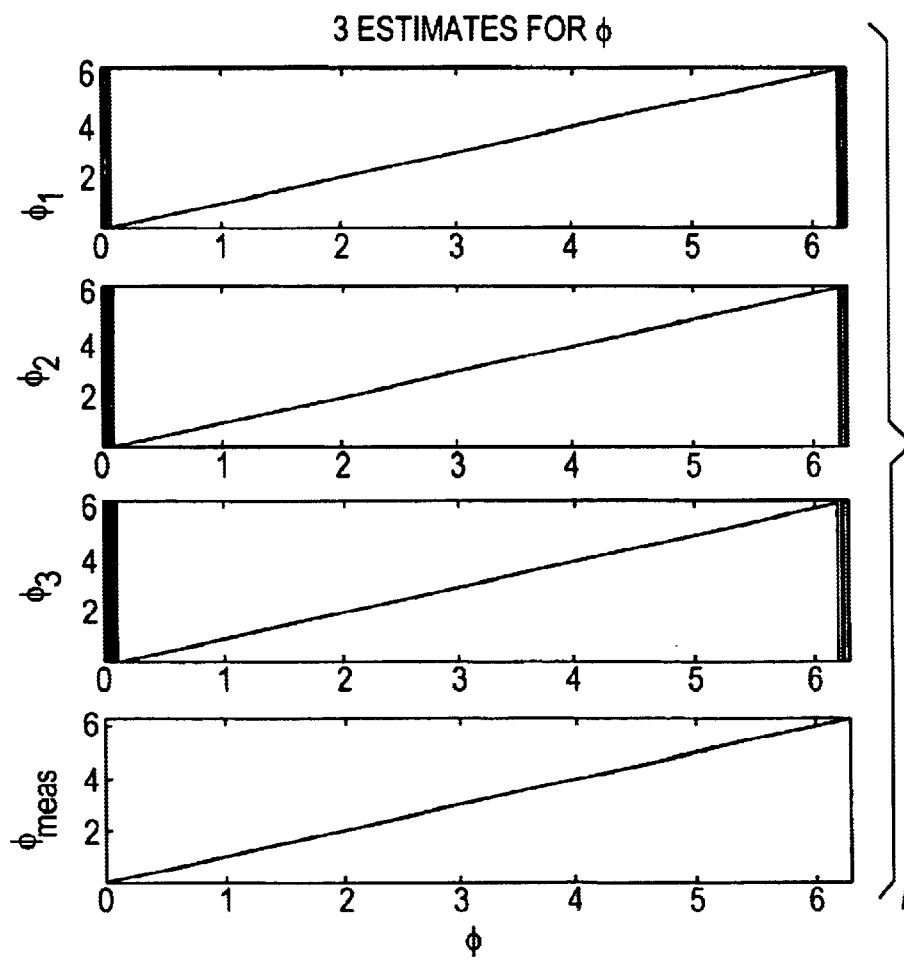
Figure 7:
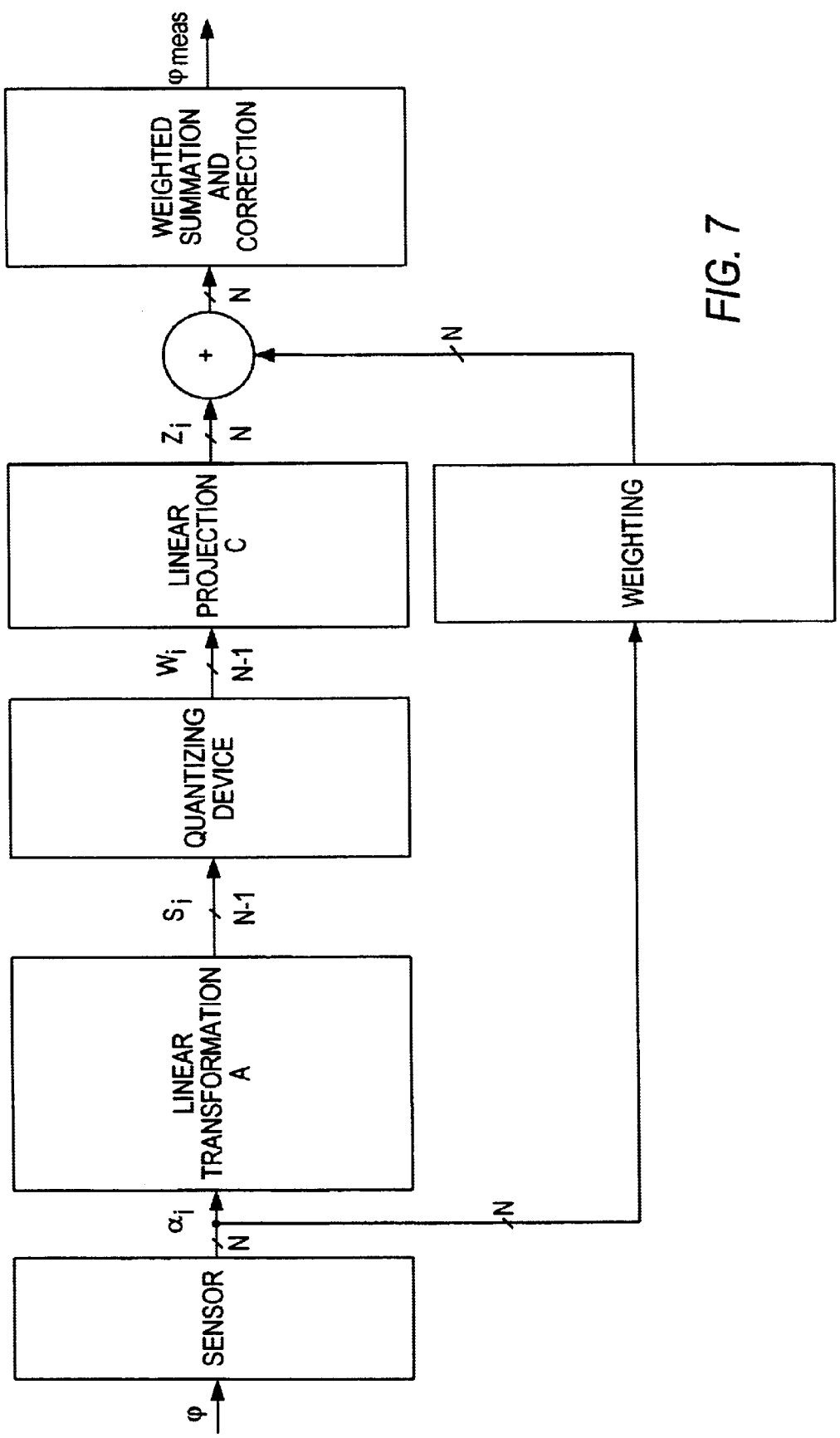
Figure 8:
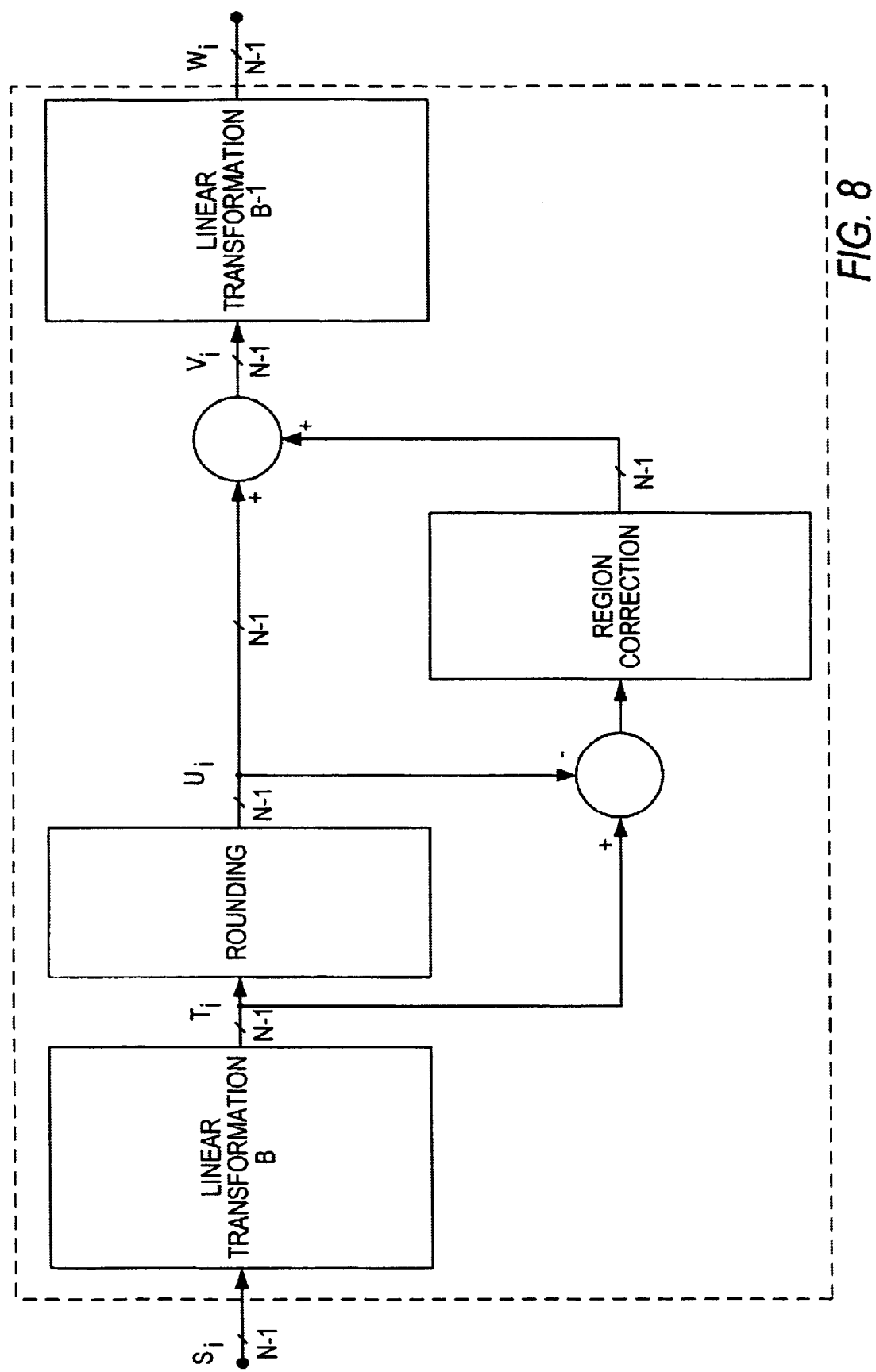

FIG. 6 shows the 3 estimates produced, underneath which their (corrected) average value is depicted, which represents the measurement value.

Embodiments

If the angle values are depicted in binary fashion, normalized to $2\pi$, then all necessary multiplications can be executed integrally or rationally The region correction of the quantizing device can be achieved through calculation (comparison of the measurement point to the region boundaries) or through tabulation (e.g. ROM table)

The method is particularly suited for use with a TAS (torque angle sensor)

With a suitable choice of the periodicities, output signals can also be achieved, which produce more than one period over a single rotation The necessary transformation matrices A, B, $B^{-1}$, C and the region boundaries of the region correction only have to be determined once when the system is designed The method can also be transferred to other systems, which supply corresponding output signals, e.g. linear transmitters and multifrequency distance measuring systems The transformations and projections to be carried out one after another can be advantageously combined, i.e. (B*A), (C*$B^{-1}$), which reduces the effort involved In the example described, the measurement errors in the measurement signals $\alpha_{1\ldots3}$ are simultaneously permitted to be up to ±45°, ±60°, ±45°. Known methods do not achieve nearly this error tolerance.

What is claimed is:

1. A method for determining a rotation angle or distance by evaluating a multitude of phase measurement values, which are recorded by a sensor during the scanning of a transmitter, characterized in that the phase measurement values are evaluated in the following steps:

A sensor supplies N measured phase measurement values $\alpha_i = \phi \cdot n_i$, each in a range from 0 to $2\pi$, where $n_i$ is the number of periods, a linear transformation A is used to project the existing phase measurement values $\alpha_i$ into N−1 new signals $S_i$ in an N−1-dimensional space, the N−1 projected signals are transformed by a quantizing device into N−1 integer values $W_i$, which lie on a grid, the transformed N−1 values $W_i$ are converted into N real values $Z_i$ by means of a linear projection C, the N real values $Z_i$ have weighted phase measurement values $\alpha_i$ added to them in modulo $2\pi$ fashion, which yields N estimates for the angle $\phi$ to be measured and the N estimates for the angle $\phi$ to be measured are corrected if needed at their skip points and are added up in a weighted fashion, taking into account their phase angle.

2. A method for determining a rotation angle or distance by evaluating a multitude of phase measurement values according to claim 1, characterized in that the evaluation takes place according to the classic vernier method, a modified vernier method, or a cascaded, modified vernier method.

* * * * *